United States Patent [19]

Streifer

[11] 3,997,721
[45] Dec. 14, 1976

[54] FLYING SPOT SCANNING SYSTEM WITH REDUCED EFFECTIVE SCAN ANGLE

[75] Inventor: William Streifer, Palo Alto, Calif.

[73] Assignee: Xerox Corporation, Stamford, Conn.

[22] Filed: Nov. 21, 1974

[21] Appl. No.: 525,696

[52] U.S. Cl. .................................. 178/7.6; 353/34
[51] Int. Cl.² ........................................ H04N 1/10
[58] Field of Search ............ 178/7.6; 352/106, 109, 352/110, 134; 353/30, 34, 37; 355/51, 60; 256/204

[56] References Cited
UNITED STATES PATENTS

| | | | |
|---|---|---|---|
| 3,063,334 | 11/1962 | Smith | 353/34 |
| 3,762,791 | 10/1973 | Fournier | 178/7.6 |
| 3,867,571 | 2/1975 | Starkweather | 178/7.6 |

Primary Examiner—Robert L. Griffin
Assistant Examiner—Michael A. Masinick
Attorney, Agent, or Firm—J. E. Beck; T. J. Anderson; L. Zalman

[57] ABSTRACT

A flying spot scanning system is provided which uses directed light from a scanning element, which directed light is reflected through a symmetrical arrangement of reflective surfaces for scanning across a medium with a planar object surface. In each scanning cycle, information is transmitted to the scanned medium by modulating the directed light in accordance with a video signal.

9 Claims, 5 Drawing Figures

FLYING SPOT SCANNING SYSTEM WITH REDUCED EFFECTIVE SCAN ANGLE

BACKGROUND OF THE INVENTION

This invention relates to a flying spot scanning system for communicating video information to a scanned medium, and more particularly to a scanning system which utilizes a symmetrical arrangement of reflective surfaces between the scanning element and the scanned medium for field flattening.

Much attention has been given to various optical approaches in flying spot scanning for the purpose of imparting the information content of a modulated light beam to a scanned medium. Galvanometer arrangements have been used to scan the light across a document for recording its information content thereon. Such arrangements have included planar reflecting mirrors which are driven in an oscillatory fashion. Other approaches have made use of multifaceted mirrors which are driven continuously. Various efforts have been made to define the spot size in order to provide for an optimum utilization of the scanning system.

One such effort is that described in U.S. Pat. No. 3,675,016. The approach used was to make the spot size invariant and as small as possible by defining the dimensions of the focused beam so that only part, preferably half, of a mirror facet is illuminated during scanning. This teaching alludes to generalized techniques for assuring the constancy of the size of the aperture of a rotating mirror scanning system.

Other approaches, such as that taught in U.S. patent application Ser. No. 488,332, filed on July 15, 1974, and assigned to the assignee of the present invention, have sought to assure a uniform spot size at the scanned medium. A convolution of focusing elements may be selected, for example, to provide an adequate depth of focus at the planar surface of the medium to compensate for focal plane errors due to the arcuate path of the scanned spot.

The present invention offers still another approach to the avoidance of focal plane error.

It is thus an object of the present invention to provide a flying spot scanning system which avoids focal plane error.

It is yet another object of the present invention to provide a spot scanning system which provides an effective uniform spot size at the contact loci of the spot with the scanned medium.

It is a further object of the present invention to provide a spot scanning system which utilizes symmetrical reflective surfaces for reducing the effective scan angle of the directed light beam.

Other objects of the invention will be evident from the description hereinafter presented.

SUMMARY OF THE INVENTION

The invention provides a flying spot scanning system which employs a scanning element for directing a beam of light to focus to a spot upon the planar surface of a medium and for enabling the spot to traverse the medium throughout a scan width. A light source, such as a laser, generates the beam of light controlled by the scanning element. The directed light beam is reflected through a symmetrical arrangement of reflective surfaces for scanning the spot across the planar object surface.

Another feature of the invention is the modulation of the original light beam by means of a video signal. The information content within the video signal is thereby imparted to the light beam itself. The medium to be scanned is one which is responsive to the modulated beam and records its information content as contained within the scanning spot in a usable form on its surface across the scan width.

Still another feature of the invention is that the arrangement of reflective surfaces is configured to reduce the effective scan angle of the directed light beam whereby focal plane errors are substantially reduced.

Yet another feature of the invention is that said reflective surfaces consist of a plurality of discrete reflective elements for the correction of focal plane error.

These and other features which are considered to be characteristic of this invention are set forth with particularity in the appended claims. The invention itself, however, as well as additional objects and advantages thereof, will best be understood in the following description when considered in conjunction with the accompanying drawings.

DESCRIPTION OF THE PREFERRED EMBODIMENT

Figure 1:
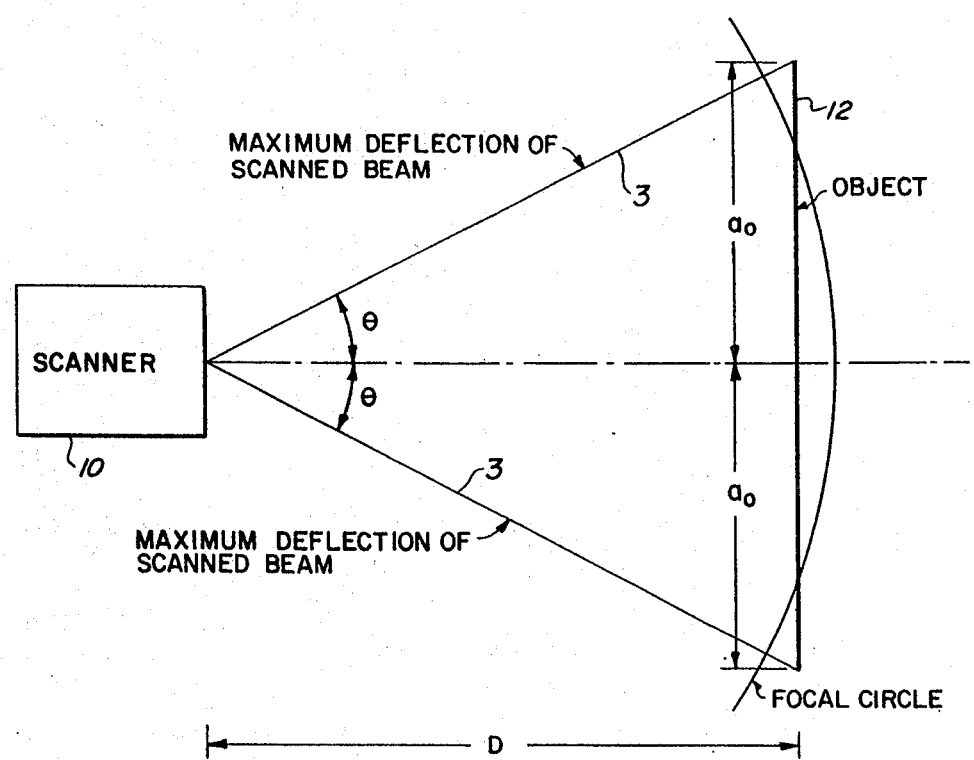
FIG. 1 is a schematic drawing of conventional prior art scanning geometry.

In FIG. 1, conventional prior art scanning geometry is shown. A scanning element 10 directs a light beam 3 throughout a scan angle $2\Theta$. The beam 3 is imaged to a spot in an arcuate focal circle which is designed in relation to a medium with a planar object surface 12. The focused spot is scanned by the scanner 10 throughout a scan width of $2a_o$ across the surface 12. Focal plane errors are associated with such a scanning geometry in that the planar surface 12 does not match the focal circle through which the spot maintains a uniform size. The scanner 10 is shown located at a distance D from the surface 12.

Figure 2:
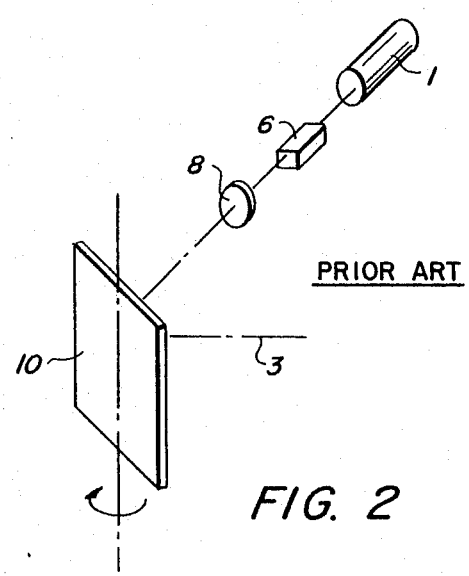
FIG. 2 is an isometric illustration of a prior art scanning element in conjunction with a source of imaged, modulated light.

The scanner 10 may be any conventional scanning element, such as an acousto-optical deflector, a scanning polygon, or even a galvanometer. As shown in FIG. 2, a galvanometer 10 is shown as the scanning element. A light source 1 provides the original light beam for utilization by the scanning system. The light source 1 is preferably a laser which generates a collimated beam of monochromatic light which may easily be modulated by a modulator 6 in conformance with the information contained in a video signal.

The modulator 6 may be any suitable electro-optical modulator for recording the video information in the form of a modulated light beam at its output. The modulator 6 may be, for example, a Pockel's cell comprising a potassium dihydrogen phosphate crystal, whose index of refraction is periodically varied by the application of the varying voltage which represents the video signal. The video signal may contain information either by means of binary pulse code modulation or wideband frequency code modulation. In any event, by means of the modulator 6, the information within the video signal is represented by the modulated light beam.

The light beam is imaged by a lens 8 to a spot in a focal circle defined with respect to the planar surface 12. While various prior art teachings have used field-flattened lenses to correct for focal plane error, such approaches have required the use of multi-element lenses and/or large amounts of glass for the lens elements. An additional disadvantage of this approach is that materials may not be available for the fabrication of such lenses, as in the case of a $CO_2$ laser providing the light beam.

Figure 3:
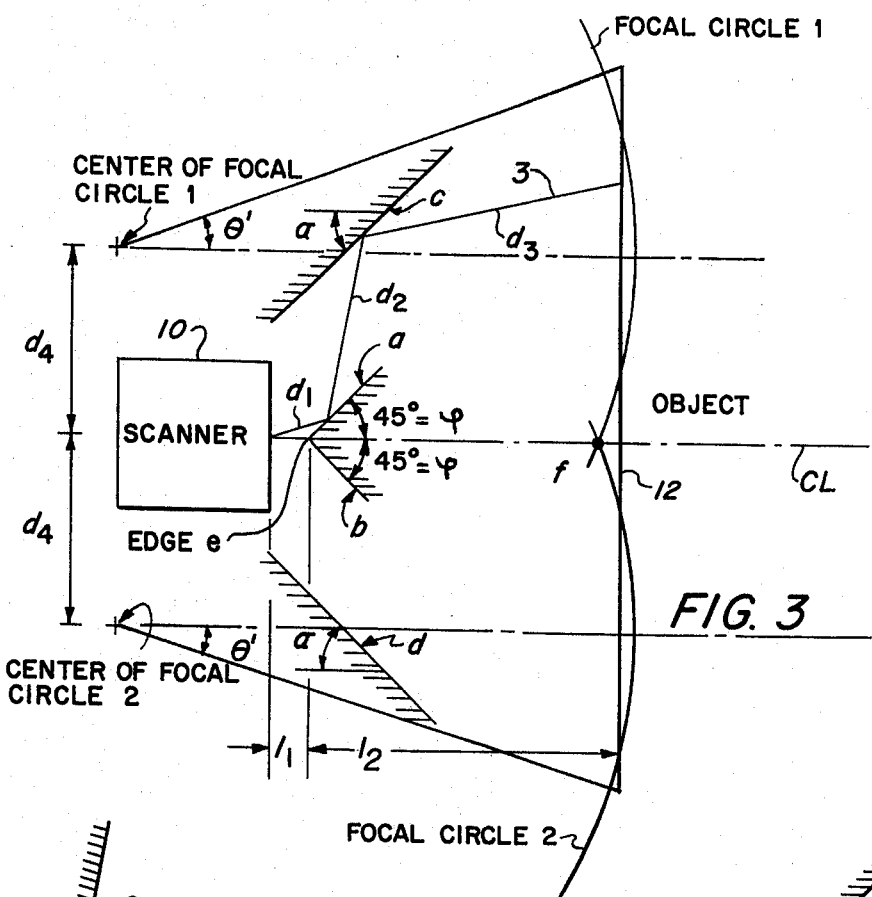
FIG. 3 is a schematic drawing of a scanning system in accordance with the invention.

In FIG. 3 is shown a flying spot scanning system in accordance with the invention. The light beam 3 is directed by the scanner 10 against a symmetrical arrangement of plane mirrors $a$, $b$, $c$ and $d$ which in turn redirect the beam 3 for scanning the imaged spot across the surface 12 throughout two focal circles 1 and 2. The plane mirrors $a$ and $b$ are joined at a vertex $e$ oriented symmetrically about the center line CL which bisects the scan angle $2\Theta$. The beam 3 when directed against the mirror $a$ becomes segmented into portions $d_1$, $d_2$, and $d_3$. The path $d_1$ defines the beam 3 in relation to the mirror $a$, the path $d_2$ represents the path of the beam 3 as reflected from the mirror $a$, which in turn is reflected from the mirror $c$ along the path $d_3$ to image to a spot in the focal circle 1.

The focal circle 1 has a radius of $d_1 + d_2 + d_3$, whose center is located a distance $d_4$ from the original centerline CL. $d_4$ is chosen to be equal to $a_o/4$ where $2a_o$ has been defined as the scan width or total object width. $d_4$, then, may be considered to be the "offset" of the effective scans respective to the focal circles 1 and 2.

As the scanned beam 3, which is of finite size, begins to intercept the vertex edge $e$, part of the beam strikes both the surface of the mirror $a$ and the surface of the mirror $b$. The portion of the beam 3 striking the mirror $b$ is in turn reflected to the mirror $d$. Of course, the beam 3 is again segmented into the three paths of travel $d_1$, $d_2$, and $d_3$ to focus to the focal circle 2. To provide optimal overlap at the line $f$ where $e$ is imaged by both the mirrors $c$ and $d$, the mirrors $d$ and $c$ are adjusted with respect to each other, such that the vertex $e$ is imaged by the mirrors $c$ and $d$ into the same line.

Since any part of the beam 3 striking the mirror $b$ does not strike the mirror $a$, the total beam energy at the surface 12 is almost constant as the beam 3 scans across the vertex $e$. Because the beam 3 is to be focused at the surface 12, its transverse extent is relatively large at the junction of the mirrors $a$ and $b$, and therefore the total relative energy scattered from the vertex $e$ is small. In this way energy is prevented from being scattered from the vertex $e$ and reflected by way of the mirrors $c$ and $d$ to undesired parts of the object surface 12. The mirrors $a$ and $b$, in this preferred embodiment, are oriented with respect to the center line CL at an angle $\psi$ of 45°, respectively. The mirrors $c$ and $d$ are angled respective to the center line CL at an angle $\alpha$, which is just under 45°, adjusted such that the vertex $e$ is simultaneously imaged to the line $f$ by both the mirrors $c$ and $d$.

The angle $\alpha$ is, in the preferred embodiment, related to the angle $\psi$ by the following approximation:

$$\tan(2\psi - 2\alpha) = \frac{a_o/2}{l_2 + (a_o/2)\tan(2\psi - \pi/2)}$$

where $l_2$ is the distance of the vertex $e$ from the surface 12. $l_1$ is the distance between the scanner 10 and the vertex $e$.

EXAMPLE 1

$\psi = 45°$, $a_o = 6$ inches, $d_1 = 4$ inches, $d_2 = 26$ inches
$\tan(90° - 2\alpha) = 3/[26 + 3\tan(0°)]$
$\alpha = 41.7°$

EXAMPLE 2

$\psi = 60°$, $a_o = 6$ inches, $d_1 = 4$ inches, $d_2 = 26$ inches
$\tan(120° - 2\alpha) = 3/[26 + 3\tan(30°)]$
$\alpha = 56.9°$ To achieve the same angle $\Theta$ defined in the prior art scanning configuration shown in FIG. 1, the paths $d_1 + d_2 + d_3$ is set equal to D/2. The mirrors $c$ and $d$ may also be shaped to correct the focal curves so that it more nearly corresponds to the planar object surface 12. The mirrored surfaces of the mirrors $a$, $b$, $c$ and $d$ may be prepared with suitable materials responsive to the wave length of the illumination from the beam 3. For example, for an infrared illumination, a thin layer of gold spray would be used to provide the mirrored surfaces. The teaching of the use of discrete reflective surfaces in accordance with the invention to image the beam 3 throughout overlapping focal circles, has an additional advantage in that the resulting correction of focal planar is free of chromatic aberration in contrast to many lens systems.

The present invention provides a substantially flattened scan that nearly corresponds to planar object surface 12 by reducing the required scan angle. In particular, referring to FIG. 3, the effective scan angles to provide focal circles 1 and 2 are less than the scan angles $\Theta$, as shown in FIG. 1.

Figure 4:
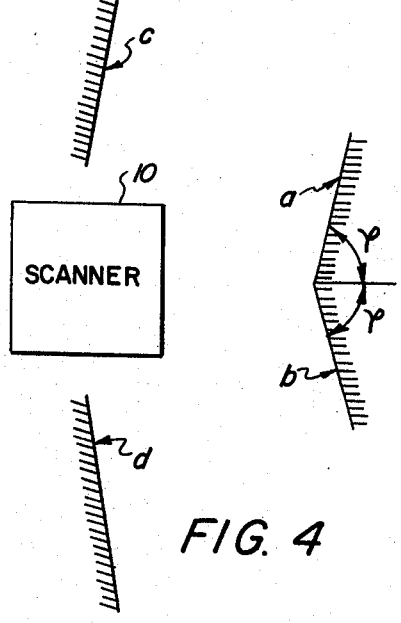
FIG. 4 is a schematic drawing of another scanning configuration which embodies features of the invention.
Figure 5:
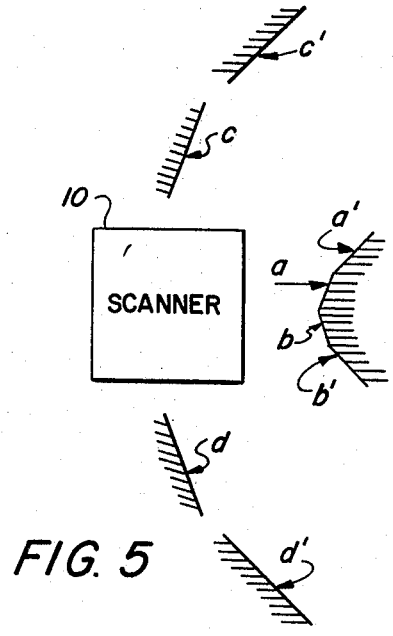
FIG. 5 is a schematic drawing of still another scanning configuration which embodies features of the invention.

Additional embodiments of the invention are shown in FIGS. 4 and 5. To foreshorten the overall physical length of the scanning system, the mirrors $a$, $b$, $c$ and $d$ are oriented at substantially larger angles of $\psi$ and $\alpha$. In FIG. 5, the mirrors $a$ and $b$ are multifaceted to split the beam 3 into a plurality of focal circles. The mirrors $c$ and $d$ are correspondingly multifaceted to provide the four focal circles, in this instance. Another possible embodiment would be to cascade the system shown in FIG. 3.

The optical scanning system disclosed in this preferred embodiment has relation to a "write" mode wherein a photosensitive medium may provide the object surface 12 for the recording of the information content of the scanning spot. In a "read" mode, an original picture or document called the object would provide the object surface 12 to be scanned by an unmodulated beam 3 to determine the reflected or transmitted intensity (and possibly color) vs. position.

Obviously, many modifications of the present invention are possible in light of the above teaching. It is therefore to be understood that, in the scope of the appended claims, the invention may be practiced other than as specifically described.

What is claimed is:

1. An optical scanning system for scanning a surface comprising:
   means for providing a beam of light,
   scanning means for directing said beam of light throughout a predetermined scan angle,
   light beam focusing means and light beam reflecting means for providing at least a pair of contiguous focal circles proximate said surface as said beam of light is scanned through said predetermined scan angle,
   said light beam reflecting means being positioned between said scanning means and said surface and symmetrical with a center-line which bisects said predetermined scan angle such that the effective scan angle of each of said focal circles is less than said predetermined scan angle whereby focal plane errors are reduced.

2. The system as defined in claim 1 wherein said light beam reflecting means is comprised of a first set of reflective surfaces which form a vertex at said center-line and are symmetrical about it to direct said beam toward a corresponding second set of reflecting surfaces which are oriented symmetric to said center-line to redirect said beam such that a pair of contiguous focal circles are provided proximate said surface.

3. The system as defined in claim 1 wherein said light beam reflecting means is comprised of first and second pairs of reflective surfaces, the surfaces of said first pair of reflective surface are joined at the vertex on said center-line at an angle $\psi$ to said center-line and the surfaces of said second pair of reflection surfaces are at an angle $\alpha$ to said center-line.

4. The system as defined in claim 1 wherein the angles $\psi$ and $\alpha$ are related by $$\tan(2\psi - 2\alpha) = \frac{a_o/2}{l_2 + (a_o/2)\tan(2\psi - \pi/2)}$$

where $a_o$ is equal to one-half the scan width at said surface and $l_2$ is the distance of the vertex from said surface.

5. Apparatus for recording information carried by an electrical signal onto a scanned surface comprising:
   means for providing a beam of light,
   means for modulating said light beam in accordance with the information content of said electrical signal,
   scanning means for directing said beam of light throughout a predetermined scan angle, and
   light beam focusing means and light beam reflecting means for providing at least a pair of contiguous focal circles proximate said surface as said beam of light is scanned throughout said predetermined scan angle,
   said light beam reflecting means being positioned between said scanning means and said surface and symmetrical with a centerline which bisects said predetermined scan angle such that the effective scan angle of each of said focal circles is less than said predetermined scan angle whereby focal plane errors are reduced.

6. The system as defined in claim 5 wherein said light beam reflecting means is comprised of a first set of reflective surfaces which form a vertex at said center-line and are symmetrical about it to direct said beam toward a corresponding second set of reflective surfaces which are oriented symmetric to said center-line to redirect said beam such that a pair of contiguous focal circles are provided proximate said surface.

7. The system as defined in claim 5 wherein said light beam reflecting means is comprised of first and second pairs of reflective surfaces, the surfaces of said first pair of reflective surfaces are joined at the vertex on said center-line at an angle $\psi$ to said center-line and the surfaces of said second pair of reflective surfaces are at an angle $\alpha$ to said center-line.

8. The system as defined in claim 5 wherein the angles $\psi$ and $\alpha$ are related by $$\tan(2\psi - 2\alpha) = \frac{a_o/2}{l_2 + (a_o/2)\tan(2\psi - \pi/2)}$$

where $a_o$ is equal to one-half the scan width of said surface and $l_2$ is the distance of the vertex from said surface.

9. The apparatus as defined in claim 8 wherein said beam of light is produced by a laser which emits collimated light of substantially uniform intensity.

* * * * *